United States Patent
Kopp et al.

(10) Patent No.: US 12,494,623 B2
(45) Date of Patent: Dec. 9, 2025

(54) BUSBAR FOR A LOW VOLTAGE, MEDIUM VOLTAGE, OR HIGH VOLTAGE SWITCHGEAR

(71) Applicant: ABB Schweiz AG, Baden (CH)

(72) Inventors: Dalibor Kopp, Brno (CZ); Radim Dolezal, Brno (CZ)

(73) Assignee: ABB Schweiz AG, Baden (CH)

( * ) Notice: Subject to any disclaimer, the term of this patent is extended or adjusted under 35 U.S.C. 154(b) by 217 days.

(21) Appl. No.: 18/506,316

(22) Filed: Nov. 10, 2023

(65) Prior Publication Data
US 2024/0162691 A1    May 16, 2024

(30) Foreign Application Priority Data
Nov. 10, 2022   (EP) .................................... 22206616

(51) Int. Cl.
  *H02B 1/20*   (2006.01)
(52) U.S. Cl.
  CPC ...................................... *H02B 1/20* (2013.01)
(58) Field of Classification Search
  CPC ...................................................... H02B 1/20
  See application file for complete search history.

(56) References Cited

U.S. PATENT DOCUMENTS

| | | | |
|---|---|---|---|
| 5,872,711 A * | 2/1999 | Janko | F28F 21/084 174/72 B |
| 10,490,990 B2 * | 11/2019 | Nieberlein | H02G 5/02 |
| 2018/0261990 A1 * | 9/2018 | Lynam | H02B 1/20 |

FOREIGN PATENT DOCUMENTS

| CN | 109767859 A | 5/2019 |
|---|---|---|
| EP | 3267571 A1 | 1/2018 |
| EP | 3273557 A1 | 1/2018 |
| JP | 2015-170540 A | 9/2015 |
| KR | 10-0631469 B1 | 10/2006 |
| KR | 10-2349392 B1 | 1/2022 |

OTHER PUBLICATIONS

European Patent Office, Extended European Search Report in European Patent Application No. 22206616.9, 8 pp. (Apr. 6, 2023).

* cited by examiner

*Primary Examiner* — Mukundbhai G Patel
(74) *Attorney, Agent, or Firm* — Leydig, Voit & Mayer, Ltd.

(57) ABSTRACT

A busbar includes a plurality of bar elements having a first bar element and a second bar element; wherein the first bar element comprises a first surface and a second surface opposite to the first surface; wherein the first bar element comprises at least one raised section or embossment protruding out from the first surface; wherein the second bar element comprises a first surface and a second surface opposite to the first surface; and wherein the first bar element is connected to the second bar element, wherein the first surface of the first bar element faces towards the first surface of the second bar element.

13 Claims, 2 Drawing Sheets

BUSBAR FOR A LOW VOLTAGE, MEDIUM VOLTAGE, OR HIGH VOLTAGE SWITCHGEAR

CROSS-REFERENCE TO RELATED APPLICATIONS

The instant application claims priority to European Patent Application No. 22206616.9, filed Nov. 10, 2022, which is incorporated herein in its entirety by reference.

FIELD OF THE DISCLOSURE

The present disclosure relates to a busbar for a low voltage, medium voltage, or high voltage switchgear.

BACKGROUND OF THE INVENTION

In the low, medium, and high voltage applications, busbars are used to carry current. The flowing current generates heat due to resistivity of the used material (e.g., cooper and aluminum). This generated heat is dissipated out of the system by convection, radiation, and conduction.

The current path provided by the busbar is designed using extruded conductor bars (bars) made of copper or aluminum or other conductive materials. These bars are connected together by connecting elements like screws etc. Furthermore, this connection generates additional heat due to electrical resistance of such connections.

With respect to alternating current flow, the skin effect pushes the current density to the surface of these bars, and which means that the cross-section of the conductor is not fully utilized. The heat is transferred to the ambient environment by convection and radiation. Those parts of the bar, that are not heated by the current flow due to skin effect, are used to distribute the heat by conduction.

Single bars of large cross-section are bulky, heavy and have limited surface for convection and radiation of the heat.

Figure 1:
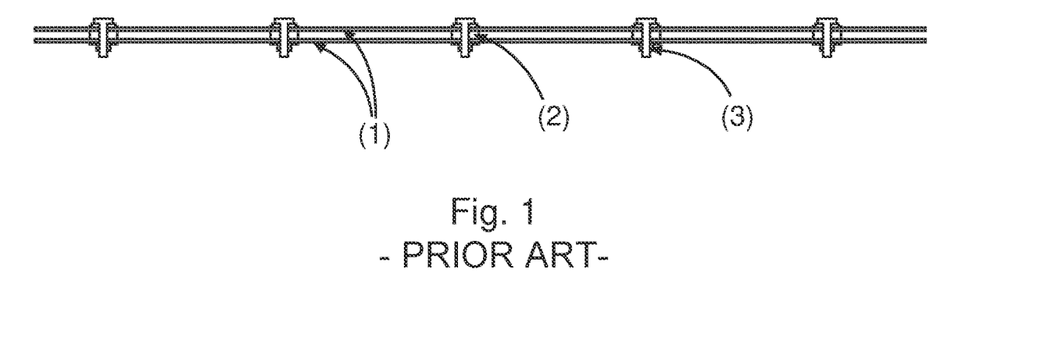

Two parallel bars are also used today for high-current applications/ratings. Those two bars are kept at a certain distance from each other by means of a spacer, which is an additional material piece placed between the bars to main a certain distance between the bars, as shown in FIG. 1, that shows parallel bars 1, with spacers 2, and with connecting means 3. Such spacers can be made of conductive or insulation material. However, in both cases, this is an additional material which requires assembly together with the bars. This results in great complexity, especially when assembling multiple parallel bars together.

BRIEF SUMMARY OF THE INVENTION

Therefore, it would be advantageous to have an improved busbar for low, medium or high voltage applications such as within a switchgear. The present disclosure describes, in one aspect, a busbar for a low voltage, medium voltage, or high voltage switchgear, the busbar comprising a plurality of bar elements, wherein the plurality of bar elements comprises a first bar element, and a second bar element.

The first bar element comprises a first surface and a second surface opposite to the first surface. The first bar element comprises at least one raised section or embossment protruding out from the first surface. The second bar element comprises a first surface and a second surface opposite to the first surface. The first bar element is connected to the second bar element, wherein the first surface of the first bar element faces towards the first surface of the second bar element.

In this manner, the two bar elements can be spaced apart from one another by at least a distance equal to a height of the at least one raised section or embossment without the need to use an additional spacer because the at least one raised section or embossment is an intrinsic part of the first bar element. This provides for an increase surface area to provide for increased cooling via convective cooling, and radiative cooling, and provides for simplification of the assembly process of busbars, and overall weight of busbars can be reduced.

BRIEF DESCRIPTION OF THE SEVERAL VIEWS OF THE DRAWING(S)

FIG. 1 shows a conventional busbar of two parallel bars with the spacers in between.

DETAILED DESCRIPTION OF THE INVENTION

FIGS. 2a, 2b, 3a, 3b, 3c, and 4 relate to a new busbar for a low voltage, medium voltage, or high voltage switchgear. The new busbar finds utility in other high current applications at these voltages.

The busbar comprises a plurality of bar elements 10. The plurality of bar elements comprises a first bar element, and a second bar element. The first bar element comprises a first surface and a second surface opposite to the first surface. The first bar element comprises at least one raised section or embossment 20 protruding out from the first surface. The second bar element comprises a first surface and a second surface opposite to the first surface. The first bar element is connected to the second bar element, and the first surface of the first bar element faces towards the first surface of the second bar element.

Figure 2A:
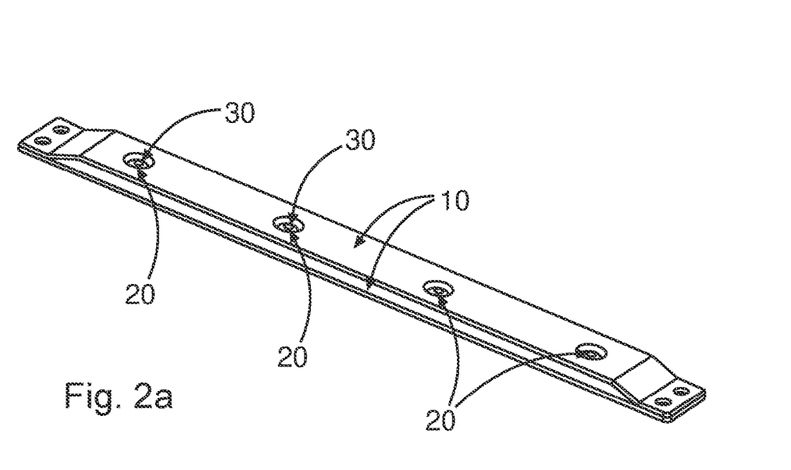
FIGS. 2a and 2b show an example of the new busbar with straight parallel bar elements (also called busbar elements) with embossments in accordance with the disclosure.
Figure 2B:
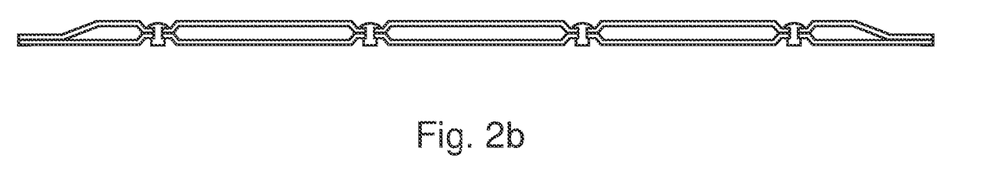

Thus, referring to FIG. 2a the first bar element can be the top bar element as shown, where the first surface is facing downwards and the second surface is facing upwards, and the raised sections or embossments are also facing downwards. The second bar element can be the bottom bar element as shown in FIG. 2b, the first surface is facing upwards the second surface is facing downwards. The second bar element however does not need to have any raised sections or embossments.

In this manner, the two bar elements can be spaced apart from one another by at least a distance equal to a height of the at least one raised section or embossment without the need to use an additional spacer because the at least one raised section or embossment is an intrinsic part of the first bar element. This provides for an increase surface area to provide for increased cooling via convective cooling, and radiative cooling, and provides for simplification of the assembly process of busbars, and overall weight of busbars can be reduced.

In an example, the first bar element has at least one angled or folded section.

In an example, the second bar element has at least one angled or folded section.

In an example, the first bar element has at least two angled or folded sections.

In an example, the second bar element has at least two angled or folded sections.

In an example, the first bar element has at least three angled or folded sections.

In an example, the second bar element has at least three angled or folded sections.

In an example, the first bar element has a center flat portion that comprises the at least one raised section or embossment protruding out from the first surface, and an end portion with a first angled or folded section abutting the center flat portion angled such that an angle at the fold measured with respect to the first surface between the center flat portion and the first angled or folded section is less than 180 degrees and the end portion has a second angled or folded section abutting the first angled or folded section angles such that an angle at the fold measured with respect to the first surface between the center flat portion and the second angled or folded section is 180 degrees. In other words, the first bar element has a dog leg end portion that has two bends that brings a final portion of the first bar element parallel to the center portion but displaced above the center portion. This enables the first bar element to be mounted to the second bar element for example, where the second angled or folded section can have one or more mounting holes enabling it to be connected to the second bar element.

In an example, the first bar element has a second end portion with a first angled or folded section abutting the center flat portion angled such that an angle at the fold measured with respect to the first surface between the center flat portion and the first angled or folded section is less than 180 degrees and the second end portion has a second angled or folded section abutting the first angled or folded section angles such that an angle at the fold measured with respect to the first surface between the center flat portion and the second angled or folded section is 180 degrees.

Referring to FIG. 2a, the first bar element as described above could therefore be the top bar element as shown. In an example, the second bar element, shown in FIG. 2b, has a center flat portion and an end portion abutting the center flat portion that is a continuation of the center flat portion. This can then be connected to the end portion of the first bar element, for example by also having one or more mounting holes.

In an example, the second bar element has a second end portion abutting the center flat portion that is a continuation of the center flat portion. This can then be connected to the second end portion of the first bar element, for example by also having one or more mounting holes that match one or more mounting holes in the second end portion of the first bar element.

Referring to FIG. 2b, the second bar element could therefore be similar to the bottom bar element as shown, except that the second bar element need not have any raised sections or embossments.

In an example, the second bar element has an end portion with a first angled or folded section abutting the center flat portion angled such that an angle at the fold measured with respect to the first surface between the center flat portion and the first angled or folded section is less than 180 degrees and the end portion has a second angled or folded section abutting the first angled or folded section angles such that an angle at the fold measured with respect to the first surface between the center flat portion and the second angled or folded section is 180 degrees. In other words, the second bar element has a dog leg end portion that has two bends that brings a final portion of the second bar element parallel to the center portion but displaced above the center portion. This enables the dog leg portion of the first bar element to be mounted to the dog leg portion of the second bar element for example, where the second angled or folded section can have one or more mounting holes enabling it to be connected to the first bar element.

In an example, the second bar element has a second end portion with a first angled or folded section abutting the center flat portion angled such that an angle at the fold measured with respect to the first surface between the center flat portion and the first angled or folded section is less than 180 degrees and the second end portion has a second angled or folded section abutting the first angled or folded section angles such that an angle at the fold measured with respect to the first surface between the center flat portion and the second angled or folded section is 180 degrees.

Thus, again referred to FIG. 2b, the second bar element could be very similar to the top of element as shown, except that the second element need not have any raised sections or embossments.

In an example, the first bar element has a bend or fold, such that an angle at the bend or fold measured with respect to the first surface either side of the fold is less than 180 degrees.

In an example, the second bar element has a bend or fold, such that an angle at the bend or fold measured with respect to the second surface either side of the fold is less than 180 degrees.

In an example, the first bar element has a bend or fold, such that an angle at the bend or fold measured with respect to the first surface either side of the fold is greater than 180 degrees.

In an example, the second bar element has a bend or fold, such that an angle at the bend or fold measured with respect to the second surface either side of the fold is greater than 180 degrees.

In an example, the first bar element has a first bend or fold, such that an angle at the bend or fold measured with respect to the first surface either side of the fold is less than 180 degrees, and the first bar element has a second bend or fold, such that an angle at the bend or fold measured with respect to the first surface either side of the fold is less than 180 degrees.

In an example, the second bar element has a first bend or fold, such that an angle at the bend or fold measured with respect to the second surface either side of the fold is less than 180 degrees, and the second bar element has a second bend or fold, such that an angle at the bend or fold measured with respect to the second surface either side of the fold is less than 180 degrees.

In an example, the first bar element has a first bend or fold, such that an angle at the bend or fold measured with respect to the first surface either side of the fold is less than 180 degrees, and the first bar element has a second bend or fold, such that an angle at the bend or fold measured with respect to the first surface either side of the fold is greater than 180 degrees.

In an example, the second bar element has a first bend or fold, such that an angle at the bend or fold measured with respect to the second surface either side of the fold is less than 180 degrees, and the second bar element has a second bend or fold, such that an angle at the bend or fold measured with respect to the second surface either side of the fold is greater than 180 degrees.

In an example, the first bar element has a first bend or fold, such that an angle at the bend or fold measured with respect to the first surface either side of the fold is less than 180 degrees, and the first bar element has a second bend or fold, such that an angle at the bend or fold measured with respect to the first surface either side of the fold is less than 180 degrees, and the first bar element has a third bend or fold such that an angle at the bend or fold measured with respect to the first surface either side of the fold is greater than 180 degrees.

In an example, the second bar element has a first bend or fold, such that an angle at the bend or fold measured with respect to the second surface either side of the fold is less than 180 degrees, and the second bar element has a second bend or fold, such that an angle at the bend or fold measured with respect to the second surface either side of the fold is less than 180 degrees, and the second bar element has a third bend or fold such that an angle at the bend or fold measured with respect to the second surface either side of the fold is greater than 180 degrees.

In an example, the first bar element has one or more folds or bends, and the second bar element has one or more folds or bends that match the one or more folds or bends of the first bar element, such that the first surface of the first bar element is maintained substantially parallel to the first surface of the second bar element.

Figures 3A, 3B, 3C:
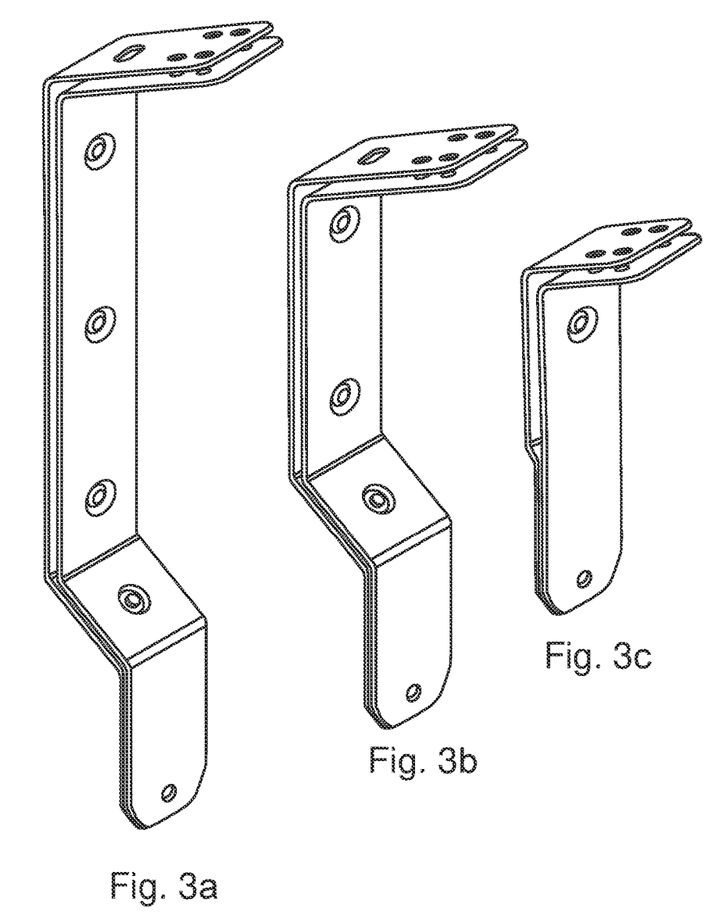
FIGS. 3a, 3b, and 3c show examples of the new busbar with various shapes of folded parallel bar elements in accordance with the disclosure.

FIGS. 3a-3c show examples of crossbars with first and second bar elements relating to the above-described examples.

In an example, the first bar element has an insulating outer layer or coating, and the second bar element has an insulating outer layer or coating.

According to an example, the first bar element comprises a plurality of through holes extending from the first surface to the second surface. The second bar element comprises a plurality of through holes extending from the first surface to the second surface. The connection of the first bar element to the second bar element comprises at least one connector 30 extending through at least one of the plurality of holes of the first bar element and extending through at least one of the plurality of holes of the second bar element. This is shown for example in FIGS. 2a and 2b, however the second bar element need not have any raised sections or embossments and the connector need not go through the center of the raised sections or embossments.

In other words, this facilitates connection of the first bar element to the second bar element.

According to an example, the at least one connector comprises at least one rivet and/or at least one screw and/or at least one nut and bolt.

According to an example, the centre of each of the at least one raised section or embossment protruding out from the first surface of the first bar element has a hole through which a connector of the at least one connection mechanism extends. This is shown for example in FIGS. 2a and 2b, however the second bar element need not have any raised sections or embossments.

In other words, the raised section(s) or embossment(s) have holes going through them that enables the first bar element to the second bar element to be connected to each and where the hole can be formed at the same time as the formation of the raised section(s) or embossment(s).

According to an example, the second bar element comprises at least one raised section or embossment 20 protruding out from the first surface. This is shown for example in FIG. 2 with both bar elements with raised sections or embossments protruding out the surfaces facing inwards; however, the raised sections or embossments need not be directly opposite one another.

Thus, a busbar can be formed from a first bar element that has raised section(s) or embossment(s) and second bar element that can be flat and have no raised section(s) or embossment(s), but also the second bar element can have raised section(s) or embossment(s). This enables for example, the bar elements to be spaced further part, via a distance equal to a height of the raised section(s) or embossment(s) of the first bar element and a height of the raised section(s) or embossment(s) of the second bar element when the abut one another to provide for increased efficiency of cooling. The first and second bar elements can be identical to each other or different to each other.

According to an example, the center of each of the at least one raised section or embossment protruding out from the first surface of the second bar element has a hole through which a connector of the at least one connection mechanism extends.

In other words, the raised section(s) or embossment(s) have holes going through them that enables the first bar element to the second bar element to be connected to each other and where the hole can be formed at the same time as the formation of the raised section(s) or embossment(s).

According to an example, each connector that extends through the center of each of the at least one raised section or embossment protruding out from the first surface of the first bar element also extends through the center of each of the at least one raised section or embossment protruding out from the first surface of the second bar element. Referring to FIGS. 2a and 2b, this situation is as shown in this figure, where the raised sections or embossments face inwards directly opposite one another, with holes through the center, through which amounting means such as a screw, reviewed, or bolt pass.

Thus, the raised section(s) or embossment(s) can face in opposite directions and face each other and be connected via holes through their centers or the raised(s) section or embossment(s) can face in the same direction and be connected via holes through their centers. In either case the first and second bar elements can be identical to each other or different to each other.

According to an example, the second bar element comprises at least one raised section or embossment 20 protruding out from the second surface. Referring to FIG. 2, this situation applies when the bottom bar element as shown is rotated such that the race sections or embossments face downwards, but where the race sections were embossments need not be lined up but could be offset.

Thus, a busbar can be formed from a first bar element that has raised section(s) or embossment(s) and second bar element that can be flat and have no raised section(s) or embossment(s), but also the second bar element can have raised section(s) or embossment(s). This enables for example, the bar elements to be spaced further part, via a distance equal to a height of the raised section(s) or embossment(s) of the first bar element and a height of the raised section(s) or embossment(s) of the second bar element when the abut one another to provide for increased efficiency of cooling. However, the raised section(s) or embossment(s) of the second bar element can face in the same direction as the raised section(s) or embossment(s) of the first bar element and the bar elements can then be stacked on top of each other, with a spacing between them equal to a heigh of the raised section(s) or embossment(s). The first and second bar elements can be identical to each other or different to each other. However, the second bar element can have raised section(s) or embossment(s) that protrude out of both sides, which facilitates easy assembly of a busbar having more than two bar elements and provides for increased cooling by increasing spacing between bar elements.

According to an example, the center of each of the at least one raised section or embossment protruding out from the second surface of the second bar element has a hole through which a connector of the at least one connection mechanism extends.

According to an example, each connector that extends through the center of each of the at least one raised section or embossment protruding out from the first surface of the first bar element also extends through the center of each of the at least one raised section or embossment protruding out from the second surface of the second bar element.

Thus, the raised section(s) or embossment(s) are aligned.

According to an example, each connector that extends through the center of each of the at least one raised section or embossment protruding out from the first surface of the first bar element extends through a hole through the second bar element that does not extend through the center of each of the at least one raised section or embossment protruding out from the second surface of the second bar element. Each connector that extends through the center of each of the at least one raised section or embossment protruding out from the second surface of the second bar element extends through a hole through the first bar element that does not extend through the center of each of the at least one raised section or embossment protruding out from the first surface of the first bar element.

In other words, the raised section(s) or embossment(s) that face in the same direction for both the first bar element and the second bar element are not aligned with each other.

According to an example, the first bar element comprises at least one raised section or embossment 20 protruding out from the second surface.

Thus, the first bar element has raised section(s) or embossment(s) on both sides and the second bar element has raised section(s) or embossment(s) on one side and can have raised section(s) or embossment(s) on both sides. This referring to FIG. 2, the top bar element as shown as restrictions or embossments facing upwards as well as downwards.

According to an example, the center of each of the at least one raised section or embossment protruding out from the second surface of the second bar element has a hole through which a connector of the at least one connection mechanism extends. Each connector that extends through the center of each of the at least one raised section or embossment protruding out from the first surface of the first bar element also extends through the center of each of the at least one raised section or embossment protruding out from the first surface of the second bar element. Each connection mechanism that extends through the center of each of the at least one raised section or embossment protruding out from the second surface of the first bar element also extends through the center of each of the at least one raised section or embossment protruding out from the second surface of the second bar element.

Thus, both bar elements have raised section(s) or embossment(s) extending out from both sides and these are aligned in that the raised section(s) or embossment(s) that face inwards are aligned with each other and the raised section(s) or embossment(s) that face outwards are aligned with each other.

According to an example, a hole that goes through the center of a raised section or embossment protruding out from the first surface of the first bar element also goes through the center of a raised section or embossment protruding out from the second surface of the first bar element. A hole that goes through the center of a raised section or embossment protruding out from the first surface of the second bar element also goes through the center of a raised section or embossment protruding out from the second surface of the second bar element.

In other words, the raised section(s) or embossment(s) on both sides of each bar element can be offset from each other or can be aligned with each other. By being aligned a reduced number of connectors such as screws, rivets or nits/bolts are required, whilst when offset increased mechanical integrity can be provided as the two bar elements can be more robustly held in place separated from each other. The bar elements can be identical to each other or be different in that the end portions of one bar element can be different to the end portions of the other bar element.

According to an example, each connector that extends through the center of each of the at least one raised section or embossment protruding out from the first surface of the first bar element extends through a hole through the second bar element that does not extend through the center of each of the at least one raised section or embossment protruding out from the first surface of the second bar element. Each connector that extends through the center of each of the at least one raised section or embossment protruding out from the first surface of the second bar element extends through a hole through the first bar element that does not extend through the center of each of the at least one raised section or embossment protruding out from the first surface of the first bar element.

The new busbar is now described in further specific detail with respect to several embodiments, where reference is again made to FIGS. 2*a*, 2*b*, 2*c*, 3*a*, 3*b*, and 4. The new busbar has bar elements with a raised section or embossment or raised sections or embossments that are made into the bar element that defines the distance to the other bar element, without the necessity to add another material element such as a spacer. It results in simplification of the assembly process of multiple parallel bar elements used, for example in low, medium or high voltage switchgears or substations. At the same time, it also reduces the overall weigh of busbars and the raw material used, as it allows to use smaller and more effective cross-section of bar elements. Furthermore, such construction also improves cooling of these bars.

The connection of the bar elements can be achieved by an embossment created by use of a simple punching tool in at least a portion of one parallel bar element and further connection of through these embossments to the other bar element(s) by basic connecting elements like for example screws, rivets, etc.

FIGS. 2*a* and 2*b* show an example of two bar elements with raised section or embossments in each of the bar elements. FIG. 2*a* shows a 3D view, and FIG. 2*b* shows a cross-section of the assembly. In FIG. 2, numeral 10 indicates the two parallel bar elements, 20 indicates the raised section or embossments and 30 indicates the connecting means.

Because the folded busbar is assembled from multiple thin-walled bar elements having air gap between each other, a large cooling effect can be achieved, due to the large surfaces. This leads to large amount of heat dissipation by convection and radiation and therefore to a reduction of the temperature rise of the busbar through the passage of current.

Because of the effective use of cross-section and use of large surfaces a significant reduction of weight of the bar elements of the busbar can be achieved. This has a very positive further effect on operation with the folded busbar in comparison to the classic busbar.

The use of large surface offered by the design of the folded busbar is not only provided in alternating current applications, but also relates to direct current applications. The skin effect will not play large role here, but the heat dissipation will occur with the same effect as for an alternating current.

A fully insulated design can be implemented, where each bar element can be insulated separately by heat shrink tube and then these elements can be connected together afterwards using standard connection elements.

The assembled busbar shown in FIGS. 2a and 2b can include multiple thin-walled bar elements (that can also be termed sheets), that cam number more than 2, that can also have extruded profiles, and can have a non-flat shape. The bar elements 10 have a high width to height ratio. These elements 10 have raised sections or embossments 20 that allow the elements to be connected together with basic connection elements and can create the folded bus bar and maintain sufficient element distance allowing a gaseous medium like air or another insulating gas to flow and transfer heat through convection, and radiative cooling is also improved.

The new busbar also results in a highly effective cooling effect and a reduction of overall weight of the busbar.

FIGS. 3a, 3b, and 3c show that the shape of the folded bus bars can be designed according to a need of the particular switchgear or space available. The raised section or embossments need not only be in a center line of the bar elements but could be eccentrically positioned to both sides of the center line.

Figure 4:
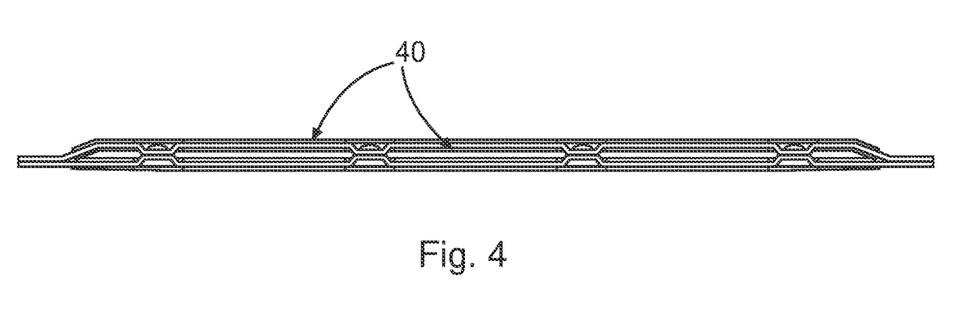
FIG. 4 shows an example of the new busbar with an insulating layer or coating in accordance with the disclosure.

FIG. 4 shows, that to accommodate the need for a fully insulated busbar design, such embossed bars 10 can be equipped with additional electric insulation 40. Here, each folded bar element 20 is equipped with heat shrink tube or paint or epoxy coating 40 and then assembled together. A painted or epoxy coating enables application of the insulation layer or coating after assembly.

An electrical insulation is usually also a thermal insulation, and this can increase the temperature of the folded bar, and such designs can take into account the specific use requirements of the new busbars.

The insulating layer can increase the temperature of a compartment of a switchgear, caused by eddy current losses, anyway the insulating layer can provide a larger surface that will help to dissipate more thermal energy caused by the eddy current losses.

The insulating layers can be created in several ways like painting, coating or epoxy heat shrinking tubes.

In an example, the first bar element comprises a plurality of through holes extending from the first surface to the second surface. The second bar element comprises a plurality of through holes extending from the first surface to the second surface. The connection of the first bar element to the second bar element comprises at least one connector extending through at least one of the plurality of holes of the first bar element and extending through at least one of the plurality of holes of the second bar element.

This facilitates connection of the first bar element to the second bar element.

In an example, the at least one connector comprises at least one rivet and/or at least one screw and/or at least one nut and bolt.

In an example, the centre of each of the at least one raised section or embossment protruding out from the first surface of the first bar element has a hole through which a connector of the at least one connection mechanism extends.

In other words, the raised section(s) or embossment(s) have holes going through them that enables the first bar element to the second bar element to be connected to each and where the hole can be formed at the same time as the formation of the raised section(s) or embossment(s).

In an example, the second bar element comprises at least one raised section or embossment protruding out from the first surface.

Thus, a busbar can be formed from a first bar element that has raised section(s) or embossment(s) and second bar element that can be flat and have no raised section(s) or embossment(s), but also the second bar element can have raised section(s) or embossment(s). This enables for example, the bar elements to be spaced further part, via a distance equal to a height of the raised section(s) or embossment(s) of the first bar element and a height of the raised section(s) or embossment(s) of the second bar element when the abut one another to provide for increased efficiency of cooling. The first and second bar elements can be identical to each other or different to each other.

In an example, the center of each of the at least one raised section or embossment protruding out from the first surface of the second bar element has a hole through which a connector of the at least one connection mechanism extends.

In other words, the raised section(s) or embossment(s) have holes going through them that enables the first bar element to the second bar element to be connected to each other and where the hole can be formed at the same time as the formation of the raised section(s) or embossment(s).

In an example, each connector that extends through the center of each of the at least one raised section or embossment protruding out from the first surface of the first bar element also extends through the center of each of the at least one raised section or embossment protruding out from the first surface of the second bar element.

Thus, the raised section(s) or embossment(s) can face in opposite directions and face each other and be connected via holes through their centers or the raised(s) section or embossment(s) can face in the same direction and be connected via holes through their centers. In either case the first and second bar elements can be identical to each other or different to each other.

In an example, the second bar element comprises at least one raised section or embossment protruding out from the second surface.

Thus, a busbar can be formed from a first bar element that has raised section(s) or embossment(s) and second bar element that can be flat and have no raised section(s) or embossment(s), but also the second bar element can have raised section(s) or embossment(s). This enables for example, the bar elements to be spaced further part, via a distance equal to a height of the raised section(s) or embossment(s) of the first bar element and a height of the raised section(s) or embossment(s) of the second bar element when the abut one another to provide for increased efficiency of cooling. However, the raised section(s) or embossment(s) of the second bar element can face in the same direction as the raised section(s) or embossment(s) of the first bar element and the bar elements can then be stacked on top of each other, with a spacing between them equal to a heigh of the raised section(s) or embossment(s). The first and second bar elements can be identical to each other or different to each other. However, the second bar element can have raised section(s) or embossment(s) that protrude out of both sides, which facilitates easy assembly of a busbar having more than two bar elements and provides for increased cooling by increasing spacing between bar elements.

In an example, the center of each of the at least one raised section or embossment protruding out from the second surface of the second bar element has a hole through which a connector of the at least one connection mechanism extends.

In an example, each connector that extends through the center of each of the at least one raised section or embossment protruding out from the first surface of the first bar element also extends through the center of each of the at least one raised section or embossment protruding out from the second surface of the second bar element. Thus, the raised section(s) or embossment(s) are aligned.

In an example, each connector that extends through the center of each of the at least one raised section or embossment protruding out from the first surface of the first bar element extends through a hole through the second bar element that does not extend through the center of each of the at least one raised section or embossment protruding out from the second surface of the second bar element. Each connector that extends through the center of each of the at least one raised section or embossment protruding out from the second surface of the second bar element extends through a hole through the first bar element that does not extend through the center of each of the at least one raised section or embossment protruding out from the first surface of the first bar element.

In other words, the raised section(s) or embossment(s) that face in the same direction for both the first bar element and the second bar element are not aligned with each other.

In an example, the first bar element comprises at least one raised section or embossment protruding out from the second surface.

Thus, the first bar element has raised section(s) or embossment(s) on both sides and the second bar element has raised section(s) or embossment(s) on one side and can have raised section(s) or embossment(s) on both sides.

In an example, the center of each of the at least one raised section or embossment protruding out from the second surface of the second bar element has a hole through which a connector of the at least one connection mechanism extends. Each connector that extends through the center of each of the at least one raised section or embossment protruding out from the first surface of the first bar element also extends through the center of each of the at least one raised section or embossment protruding out from the first surface of the second bar element. Each connector that extends through the center of each of the at least one raised section or embossment protruding out from the second surface of the first bar element also extends through the center of each of the at least one raised section or embossment protruding out from the second surface of the second bar element.

Thus, both bar elements have raised section(s) or embossment(s) extending out from both sides and these are aligned in that the raised section(s) or embossment(s) that face inwards are aligned with each other and the raised section(s) or embossment(s) that face outwards are aligned with each other.

In an example, a hole that goes through the center of a raised section or embossment protruding out from the first surface of the first bar element also goes through the center of a raised section or embossment protruding out from the second surface of the first bar element. A hole that goes through the center of a raised section or embossment protruding out from the first surface of the second bar element also goes through the center of a raised section or embossment protruding out from the second surface of the second bar element.

In other words, the raised section(s) or embossment(s) on both sides of each bar element can be offset from each other or can be aligned with each other. By being aligned a reduced number of connection arrangements or mechanisms such as screws, rivets, spot welds, or nuts/bolts are required, whilst when offset increased mechanical integrity can be provided as the two bar elements can be more robustly held in place separated from each other. The bar elements can be identical to each other or be different in that the end portions of one bar element can be different to the end portions of the other bar element.

In an example, each connector that extends through the center of each of the at least one raised section or embossment protruding out from the first surface of the first bar element extends through a hole through the second bar element that does not extend through the center of each of the at least one raised section or embossment protruding out from the first surface of the second bar element. Each connector that extends through the center of each of the at least one raised section or embossment protruding out from the first surface of the second bar element extends through a hole through the first bar element that does not extend through the center of each of the at least one raised section or embossment protruding out from the first surface of the first bar element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A busbar for a low voltage, medium voltage, or high voltage switchgear, comprising:
a plurality of bar elements, wherein the plurality of bar elements comprises:
a first bar element; and
a second bar element;
wherein the first bar element comprises a first surface and a second surface opposite to the first surface;
wherein the first bar element comprises at least one raised section or embossment protruding out from the first surface;
wherein the second bar element comprises a first surface and a second surface opposite to the first surface;
wherein the second bar element comprises at least one raised section or embossment protruding out from the first surface;
wherein a center of each of the at least one raised section or embossment protruding out from the first surface of the second bar element has a hole through which a connection device of the at least one connection mechanism extends; and
wherein the first bar element is connected to the second bar element, wherein the first surface of the first bar element faces towards the first surface of the second bar element.

2. The busbar according to claim 1, wherein the first bar element comprises a plurality of through holes extending from the first surface to the second surface, wherein the second bar element comprises a plurality of through holes extending from the first surface to the second surface, and wherein the connection of the first bar element to the second bar element comprises at least one connection mechanism extending through at least one of the plurality of holes of the first bar element and extending through at least one of the plurality of holes of the second bar element.

3. The busbar according to claim 2, wherein the at least one connection mechanism comprises at least one rivet and/or at least one screw and/or at least one nut and bolt.

4. The busbar according to claim 2, wherein a center of each of the at least one raised section or embossment protruding out from the first surface of the first bar element has a hole through which a connector of the at least one connection mechanism extends.

5. The busbar according to claim 1 wherein each connector that extends through a center of each of the at least one raised section or embossment protruding out from the first surface of the first bar element also extends through the center of each of the at least one raised section or embossment protruding out from the first surface of the second bar element.

6. The busbar according to claim 1, wherein the second bar element comprises at least one raised section or embossment protruding out from the second surface.

7. The busbar according to claim 6, wherein a center of each of the at least one raised section or embossment protruding out from the second surface of the second bar element has a hole through which a connector of the at least one connection mechanism extends.

8. The busbar according to claim 7, wherein each connector that extends through the center of each of the at least one raised section or embossment protruding out from the first surface of the first bar element also extends through the center of each of the at least one raised section or embossment protruding out from the second surface of the second bar element.

9. The busbar according to claim 7, wherein each connector that extends through the center of each of the at least one raised section or embossment protruding out from the first surface of the first bar element extends through a hole through the second bar element that does not extend through the center of each of the at least one raised section or embossment protruding out from the second surface of the second bar element, and wherein each connector that extends through the center of each of the at least one raised section or embossment protruding out from the second surface of the second bar element extends through a hole through the first bar element that does not extend through the center of each of the at least one raised section or embossment protruding out from the first surface of the first bar element.

10. The busbar according to claim 1, wherein the first bar element comprises at least one raised section or embossment protruding out from the second surface.

11. The busbar according to claim 10, wherein the center of each of the at least one raised section or embossment protruding out from the second surface of the second bar element has a hole through which a connector of the at least one connection mechanism extends, wherein each connector that extends through the center of each of the at least one raised section or embossment protruding out from the first surface of the first bar element also extends through the center of each of the at least one raised section or embossment protruding out from the first surface of the second bar element, and wherein each connector that extends through the center of each of the at least one raised section or embossment protruding out from the second surface of the first bar element also extends through the center of each of the at least one raised section or embossment protruding out from the second surface of the second bar element.

12. The busbar according to claim 11, wherein a hole that goes through the center of a raised section or embossment protruding out from the first surface of the first bar element also goes through the center of a raised section or embossment protruding out from the second surface of the first bar element, and wherein a hole that goes through the center of a raised section or embossment protruding out from the first surface of the second bar element also goes through the center of a raised section or embossment protruding out from the second surface of the second bar element.

13. The busbar according to claim 1, wherein each connector that extends through the center of each of the at least one raised section or embossment protruding out from the first surface of the first bar element extends through a hole through the second bar element that does not extend through the center of each of the at least one raised section or embossment protruding out from the first surface of the second bar element, and wherein each connector that extends through the center of each of the at least one raised section or embossment protruding out from the first surface of the second bar element extends through a hole through the first bar element that does not extend through the center of each of the at least one raised section or embossment protruding out from the first surface of the first bar element.

\* \* \* \* \*